United States Patent [19]
Collings, Jr.

[11] 4,210,338
[45] Jul. 1, 1980

[54] PISTON RING ASSEMBLY

[75] Inventor: Charles A. Collings, Jr., Columbus, Ind.

[73] Assignee: Cummins Engine Company, Inc., Columbus, Ind.

[21] Appl. No.: 973,737

[22] Filed: Dec. 28, 1978

[51] Int. Cl.² .............................. F16J 9/06; F16J 9/12
[52] U.S. Cl. ...................................... 277/76; 267/1.5; 277/139; 277/216
[58] Field of Search ................... 277/75, 76, 216, 139, 277/138, 140, 152, 153, 156, 217–222; 267/1.5

[56] References Cited
U.S. PATENT DOCUMENTS

| 1,868,744 | 7/1932 | Grant | 277/75 |
| 3,066,943 | 12/1962 | Brenneke | 277/139 |
| 3,195,903 | 7/1965 | Hesling | 277/76 X |
| 3,370,858 | 2/1968 | Braendel | 267/1.5 X |

FOREIGN PATENT DOCUMENTS

| 241842 | 11/1962 | Australia | 277/76 |
| 180179 | 11/1954 | Austria | 277/76 |
| 1245223 | 9/1971 | United Kingdom | 277/75 |

Primary Examiner—Robert S. Ward, Jr.
Attorney, Agent, or Firm—Neuman, Williams, Anderson & Olson

[57] ABSTRACT

A piston ring assembly for placement between a piston and a cylinder wall is provided. The assembly includes an annular expansion ring disposed around the piston, and an annular parted piston ring disposed around the expansion ring. A predetermined segment of the piston ring engages the expansion ring.

12 Claims, 21 Drawing Figures

U.S. Patent Jul. 1, 1980 Sheet 1 of 2 4,210,338
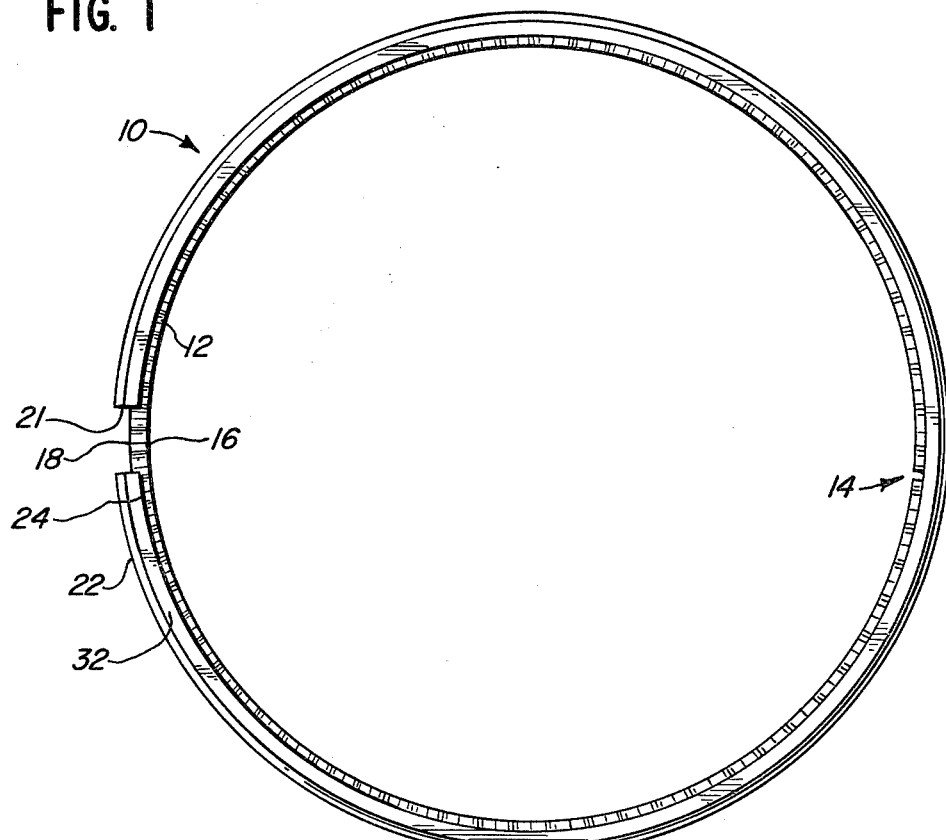
FIG. 1
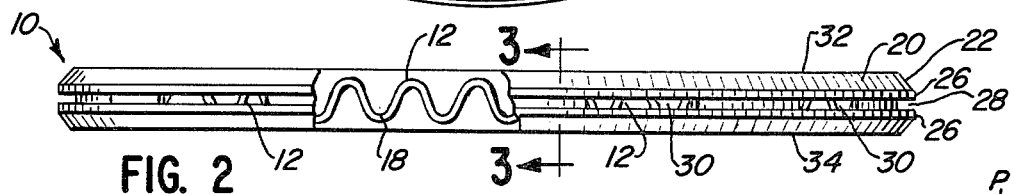
FIG. 2
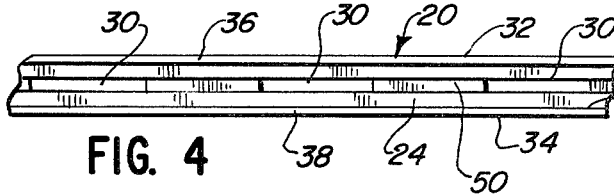
FIG. 4
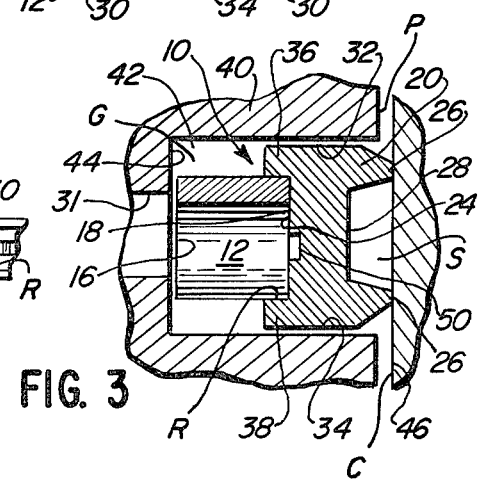
FIG. 3
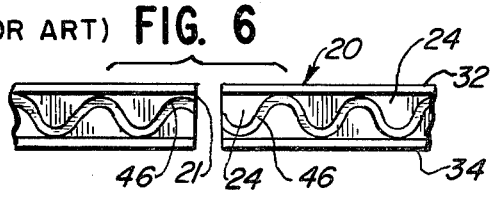
(PRIOR ART) FIG. 6
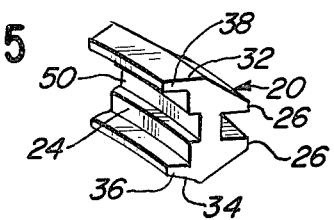
FIG. 5

PISTON RING ASSEMBLY

BACKGROUND OF THE INVENTION

This invention relates to a novel piston ring assembly for use in internal combustion engines or the like. More particularly, it relates to an oil ring assembly including a piston ring and an expansion ring.

Internal combustion engines, air compressors, and other piston equipment typically have compression rings and oil rings. The compression rings are usually circumferentially disposed around the piston end nearest the compression chamber. They form a gas tight seal between the piston and cylinder wall and provide a bearing surface to guide the piston as it reciprocates in the cylinder. The compression ring must accomplish these objectives reliably and be long lasting, despite the high temperatures and extremes in pressures encountered. Failure may lead to excessive wear, loss of power, a decline in efficiency, or scoring of the cylinder wall. Repair to correct these problems requires a major overhaul and down time of the engine.

The oil ring is usually located below the compression rings and in the piston ring grooves nearest the oil reservoir or source of cylinder wall lubrication. The purpose of an oil ring is to provide oil control and lubrication for the compression ring or rings by efficiently metering a very thin coat of lubricating oil onto the cylinder wall or cylinder liner wall over the entire stroke of the piston. While providing lubrication, the oil ring must also scrape excess oil from the cylinder wall and return it to the oil sump, thereby preventing such problems as fouling and excess oil consumption. The radially outward pressure of the oil ring against the cylinder wall is maintained primarily by an expansion ring, of either helical, serpentine, or similar configuration, which is interposed the piston and the oil ring and is circumferentially compressed when the piston ring is in the cylinder.

Oil control is further complicated because cylinder walls are not perfectly round. Hereinafter when referring to cylinder walls it is intended to include cylinder liner walls as well. Both old and new cylinders are subject to wear and fatigue and become distorted due to thermal, mechanical, or structural stress. Accordingly, piston rings must expand and contract along the entire length of the piston stroke to conform to the cylinder wall. This flexing is accommodated by the parted portion of the piston ring.

The constant flexing of the piston ring against the expansion ring often results in wear tracks being formed on the inner circumferential surface of the piston ring. This condition is normally enhanced at the parted portion of the oil ring, and as the expansion ring wears into the piston ring, the expansion ring becomes united with the piston ring and ceases to function independently as an expander. Continued flexing frequently causes the expansion ring to fracture in the vicinity where the piston ring is parted, thereby resulting in failure and requiring replacement thereof. To replace one or more rings involves substantial disassembly of the engine which is costly and time consuming.

SUMMARY OF THE INVENTION

Accordingly, it is an object of this invention to overcome the aforenoted limitations and disadvantages of the prior structures of this general type.

It is a further object of the invention to provide an improved piston ring assembly of the type described which effectively prolongs the wear life of both the expansion and oil rings.

It is a further object of the invention to provide an improved piston ring assembly of the type described which has a high degree of flexibility.

It is a still further object of the invention to provide an improved piston ring assembly which significantly minimizes fracturing or break down of the expansion ring.

Further and additional objects will become apparent from the description, accompanying drawings, and appended claims.

In accordance with an embodiment of the invention, an annular expansion ring is provided which embodies an axial piston ring bearing portion. An annular parted piston ring is disposed substantially circumferentially around the expansion ring. The piston ring includes an outer portion for bearing against a cylinder wall, and an inner portion for bearing against predetermined surface portions of the expansion ring. The inner portion includes at least one circumferentially continuous groove spaced radially outwardly and in non-bearing relation with the expansion ring.

DESCRIPTION OF THE DRAWINGS

FIG. 1 is a top plan view of one embodiment of the improved piston ring assembly per se.

FIG. 2 is a side elevational view of the piston ring assembly of FIG. 1, with a portion of the piston ring removed to show the expansion ring which is in bearing contact with the inner portion of the piston ring.

FIG. 3 is an enlarged fragmentary sectional view taken along line 3—3 of FIG. 2.

FIG. 4 is an enlarged fragmentary side elevational view of the inner portion of the piston ring shown in the assembly of FIG. 1.

FIG. 5 is a fragmentary perspective view of one parted end of the piston ring shown in FIG. 4.

FIG. 6 is a fragmentary side elevational view similar to FIG. 4 of the parted portion of a conventional piston ring showing typical expansion ring wear tracks which have formed therein. This is typical of the prior art.

DESCRIPTION

Figure 7A:
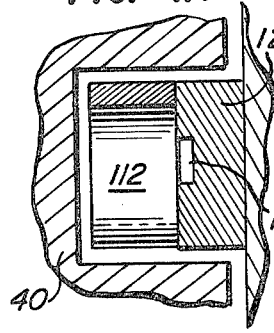
FIGS. 7A–7D, 8A–8D, 9A–9D, and 10A–10C are all enlarged fragmentary vertical sectional views of alternate embodiments of the piston ring assembly shown mounted on a piston head and disposed within a cylinder bore or cylinder liner.
Figure 7B:
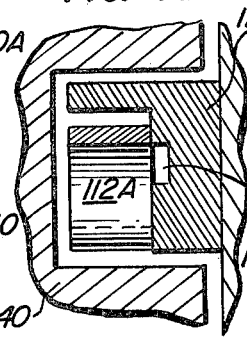
Figure 7C:
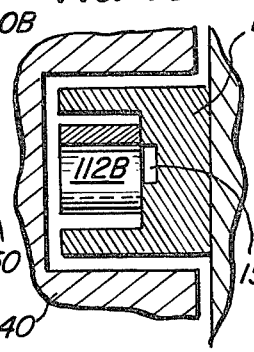

The following detailed description is illustrative of the best mode presently contemplated of carrying out the invention, and is not to be interpreted as limiting the disclosure.

Referring to FIGS. 1, 2 and 3, one form of the improved piston ring assembly 10 is shown which includes an annular expansion ring 12 and a corresponding annular piston ring 20. The ring 12 is parted at 14 and may have a sinusoidally corrugated configuration commonly referred to in the art as a serpentine expansion ring. Ring 12 is provided with an inner axial piston bearing surface 16 and an outer axial piston ring bearing surface 18. The expansion ring is of metal or other suitable material and is flexible and resilient so as to exert an outward force on the encompassing piston ring 20. The ring 12 may assume a variety of alternate forms, such as a helical spring.

The annular piston ring 20 is similarly parted at 21 and includes an outer portion 22 which bears at least in part against a cylinder wall C, and an inner annular portion 24 which bears at least in part against the surface portion 18 of the expansion ring 12, see FIG. 3.

In the illustrated embodiment, a pair of axially spaced cicumferential exterior rails or protuberances 26 are formed on the outer portion 22 of ring 20 and are in sliding contact with the cylinder wall C. The rails coact to define circumferential annular slots having the base 28 thereof provided with a plurality of circumferentially spaced ports 30 through which excess oil may drain towards the center of the piston via a radial opening 31 formed in the base 44 of an annular groove G provided in the exterior surface of the piston 40. The excess oil passing through opening 31 returns to the oil sump, not shown.

The piston ring 20 includes top and bottom surfaces 32 and 34 which alternately engage corresponding surface portions of groove G as the piston reciprocates within the cylinder. The configuration of the top and bottom surfaces 32 and 34 as well as the configuration and number of rails 26 formed in the piston ring 20, may be altered as desired.

Referring now to FIGS. 4 and 5, the inner annular portion 24 of the piston ring 20 is provided with an annular centrally disposed recess R for accommodating the outer surface portion 18 of expansion ring 12. Disposed on opposite sides of the recess is a pair of radially inwardly extending shoulders 36 and 38 which serve to capture the expansion ring within the recess. In certain instances, one or both of these shoulders may be omitted as will be discussed hereinafter. A circumferentially continuous groove 50 is formed in the base of the recess R and may have various cross-sectional configurations (e.g., rectangular, circular).

Referring again to FIG. 3, a piston 40 has surface groove G which accommodates both the expansion ring 12 and a substantial portion of the piston ring 20. The rails 26 of the piston ring 20 project radially outwardly from groove G and span the clearance between the cylinder wall C and the exterior surface P of the piston and are in resilient sliding contact with the cylinder wall C.

The cylinder wall C is sized relative to the piston ring 20 so as to cause the latter to be compressed against the expansion ring 12 which in turn is compressed against base surface 44 of the groove G. In normal operation, such pressure, and the constant flexing of the piston ring due to irregularities in the cylinder wall surfaces, causes the piston ring 20 to move or slide relative to the expansion ring, causing wear to occur in the positioning of the ring at the points of contact between the expansion ring and the recess R formed in the inner portion 24 of ring 20. Although such wear occurs around the entire piston ring, the greatest flexing and movement of the ring occurs adjacent the part 21 and therefore the most severe wear occurs in the segment of the recess adjacent the part 21. As depicted in FIG. 6, the normal wear pattern in a conventional ring 20 is in the form of tracks 46 which may become sufficiently deep to cause the piston ring 20 and the expansion ring 12 to lock up or unite. Once lock up occurs, continued flexing of the piston ring is restrained and the expansion ring and/or the piston ring will fracture in the vicinity of the part 14 or 21.

The continuous groove 50 provided in the base of recess 12 need only be approximately 0.005 inches deep so as to provide a continuous band free of contact by the expansion ring 12, thereby reducing the areas of friction which exist between the two rings and significantly diminish, if not eliminate, the occurrence of lock up even in the presence of severe wear tracks. As an alternative, since the wear tracks 46 are most severe nearest the part or gap 21 formed in the piston ring, expansion ring breakage may be substantially lessened even if the groove 50 extends only approximately one-half inch on either side of the parting.

The wear problems of the prior art are not resolved by merely reducing the areas of friction due to pressure between the expansion ring and piston ring because such a reduction in pressure would result in excessive oil consumption caused by leakage past the piston ring during the piston stroke.

Figure 7D:
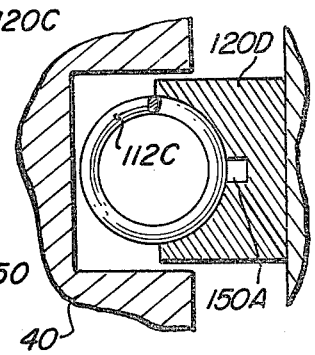
Figure 8A:
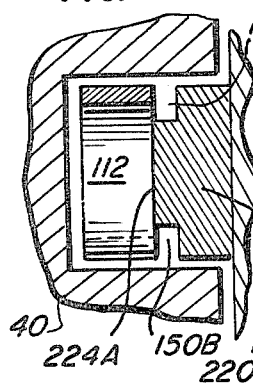
Figure 8B:
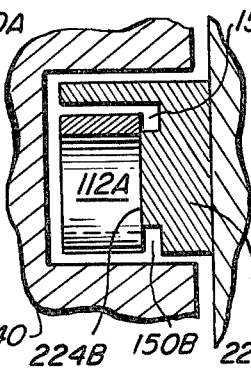
Figure 8C:
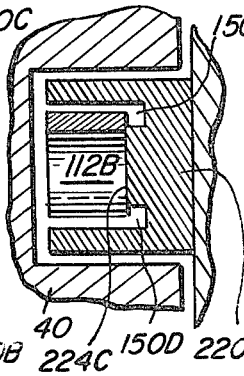
Figure 8D:
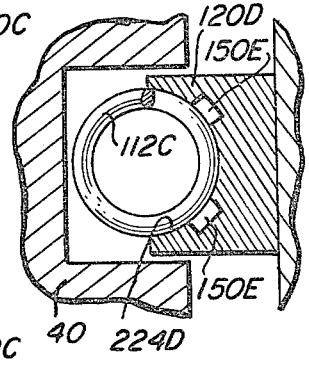
Figure 9A:
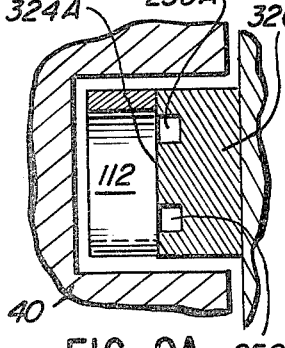
Figure 9B:
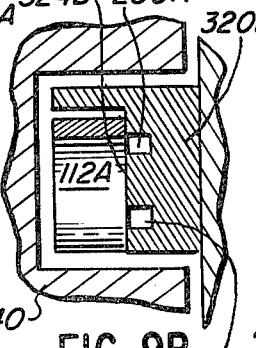
Figure 9C:
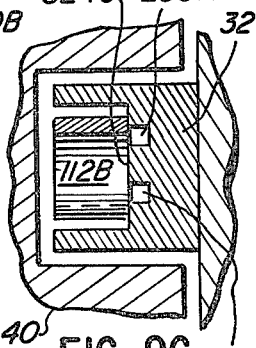
Figure 9D:
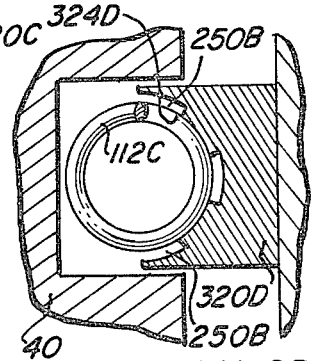

As shown in FIGS. 7A-7D, a centrally disposed groove 150 or 150A, may be utilized with piston rings having a variety of cross-sectional configurations, including helical expansion rings as shown in FIG. 7D.

Figure 10A:
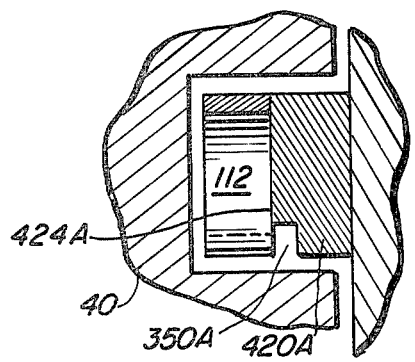
Figure 10B:
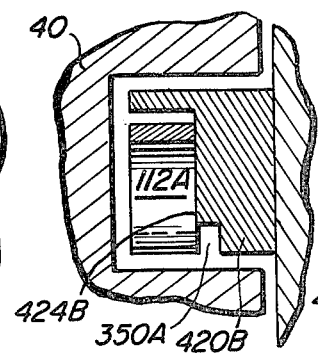
Figure 10C:
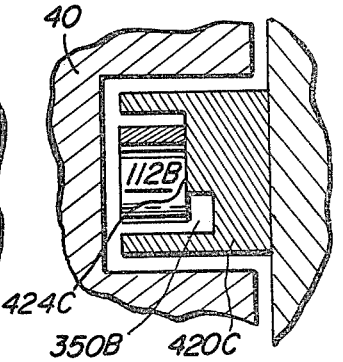

FIGS. 8A-8D and 9A-9D disclose the use of two grooves disposed at various axial positions on the inner portions 224A-224D of the respective piston rings 220A-220D and inner portions 324A-324D of the respective piston rings 320A-320D. FIGS. 10A-10C disclose the use of a single groove disposed adjacent the periphery of the inner portions 424A-424C of the respective piston rings 420A-420C.

Obviously many modifications and other embodiments of the subject invention for any number of piston rings and expansion rings will readily come to one skilled in the art having the benefit of the teachings presented in the foregoing descriptions in accompaniment with the associated drawings. Therefore it is to be understood that the invention is not to be limited thereto and that said modifications and embodiments are intended to be included within the scope of the appended claims.

What is claimed is:

1. A piston ring assembly comprising
   an annular parted expansion ring having an axial piston ring bearing portion; and
   an annular parted piston ring disposed substantially circumferentially around said expansion ring and having an outer annular portion and an inner annular portion, the latter having a predetermined segment thereof in bearing contact with the bearing portion of said expansion ring; said inner annular portion being provided with at least one circumferential recess spaced generally radially outwardly from and in non-bearing relationship with the bearing portion of said expansion ring.

2. A piston ring assembly as in claim 1 wherein said expansion ring has a sinusoidal corrugated configuration.

3. A piston ring assembly as in claim 1 wherein said expansion ring has a helical coiled configuration.

4. A piston ring assembly as in claim 1 wherein said outer annular piston ring portion includes at least one radially outwardly extending circumferential protuberance.

5. A piston ring assembly as in claim 4 wherein said piston ring includes a pair of axially separated protuberances coacting to form an outer circumferential channel.

6. A piston ring assembly as in claim 5 wherein said channel includes a base surface having formed therein a plurality of circumferentially spaced ports.

7. A piston ring assembly as in claim 1 wherein said inner piston ring portion includes a radially inwardly extending shoulder superposed said expansion ring.

8. A piston ring assembly as in claim 1 wherein said inner piston ring portion includes a radially inwardly extending shoulder subtending said expansion ring.

9. A piston ring assembly as in claim 1 wherein said inner piston ring portion includes two radially inwardly extending shoulders between which said expansion ring is disposed.

10. A piston ring assembly as in claim 1 wherein said circumferential recess comprises a single groove substantially axially centered of said inner piston ring portion.

11. A piston ring assembly for placement between a piston and a cylinder wall, said assembly comprising
an annular parted expansion ring encompassing said piston and disposed within a continuous groove formed in the exterior surface of said piston; and
an annular parted piston ring encompassing said expansion ring and having an outer annular portion in sliding substantially sealing engagement with said cylinder wall, and an inner annular portion in bearing engagement with a predetermined segment of the bearing portion of said expansion ring; said inner portion including at least one groove spaced generally radially outwardly from and in non-bearing relation with the bearing portion of said expansion ring and extending substantially circumferentially in opposite directions from a part formed in said piston ring.

12. A piston ring assembly comprising
an annular sinusoidally corrugated expansion ring having an outer axial bearing portion; and
an annular parted piston ring encompassing said expansion ring and having an outer annular portion including two radially outwardly extending circumferential protuberances axially separated and an inner annular portion bearing at least in part against the outer axial bearing portion of said expansion ring, said inner portion being provided with a recess in which the outer axial bearing portion of said expansion ring is disposed, and at least one circumferentially continuous groove being formed in the base of the recess and in non-bearing relation with said expansion ring.

* * * * *